US008439130B2

(12) United States Patent  (10) Patent No.: US 8,439,130 B2
Degrange et al.  (45) Date of Patent: May 14, 2013

(54) METHOD AND APPARATUS FOR SEISMIC DATA ACQUISITION DURING DRILLING OPERATIONS

(75) Inventors: Jean-Marie Degrange, Houston, TX (US); Charles Peter Deri, Missouri City, TX (US); Neil Kelsall, Stavanger (NO); Edward Kent Ferguson, Kingwood, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 324 days.

(21) Appl. No.: 13/031,552

(22) Filed: Feb. 21, 2011

(65) Prior Publication Data
US 2011/0203846 A1  Aug. 25, 2011

Related U.S. Application Data

(60) Provisional application No. 61/306,895, filed on Feb. 22, 2010, provisional application No. 61/433,497, filed on Jan. 17, 2011.

(51) Int. Cl.
*E21B 47/00* (2012.01)
(52) U.S. Cl.
USPC .............................................. 175/40; 175/50
(58) Field of Classification Search ..................... 175/40, 175/50
See application file for complete search history.

(56) References Cited

U.S. PATENT DOCUMENTS

| | | | |
|---|---|---|---|
| 3,696,332 A | 10/1972 | Dickson, Jr. et al. | |
| 5,589,775 A * | 12/1996 | Kuckes | 324/346 |
| 6,308,137 B1 | 10/2001 | Underhill et al. | |
| 6,606,009 B2 | 8/2003 | Gunawardana et al. | |
| 6,670,880 B1 | 12/2003 | Hall et al. | |
| 6,912,465 B2 | 6/2005 | Collins et al. | |
| 7,025,130 B2 * | 4/2006 | Bailey et al. | 166/65.1 |
| 7,400,262 B2 * | 7/2008 | Chemali et al. | 340/854.3 |
| 7,419,018 B2 * | 9/2008 | Hall et al. | 175/414 |
| 2008/0202767 A1 * | 8/2008 | Sheiretov et al. | 166/381 |
| 2009/0272578 A1 * | 11/2009 | MacDonald | 175/26 |

FOREIGN PATENT DOCUMENTS

GB  2405205 B  9/2007

OTHER PUBLICATIONS

Pascal Breton et al., "Well Positioned Seismic Measurements," Oilfield Review, pp. 32-45, Spring, 2002.

* cited by examiner

*Primary Examiner* — William P Neuder
(74) *Attorney, Agent, or Firm* — Jianguang Du; Brigitte Jeffery Echols

(57) ABSTRACT

An apparatus and method are provided for obtaining formation data while drilling. The apparatus may include a drill string and a plurality of sensors. At least two of the plurality of sensors are spaced apart along the drill string a approximately the same distance as a length of a segment of the drill string. The segment of the drill string is either added to or removed from the rest of the drill string as the drill string moves in the borehole during a drilling operation. The method may include providing numerous sensors along a drill string and repeating a cycle of various functions. The cycle may include performing an operation moving the drill string relative to the borehole and stopping movement of the drill string. Additional functions may include changing an overall length of the drill string and performing the formation property while the drill string is relatively stationary.

18 Claims, 10 Drawing Sheets

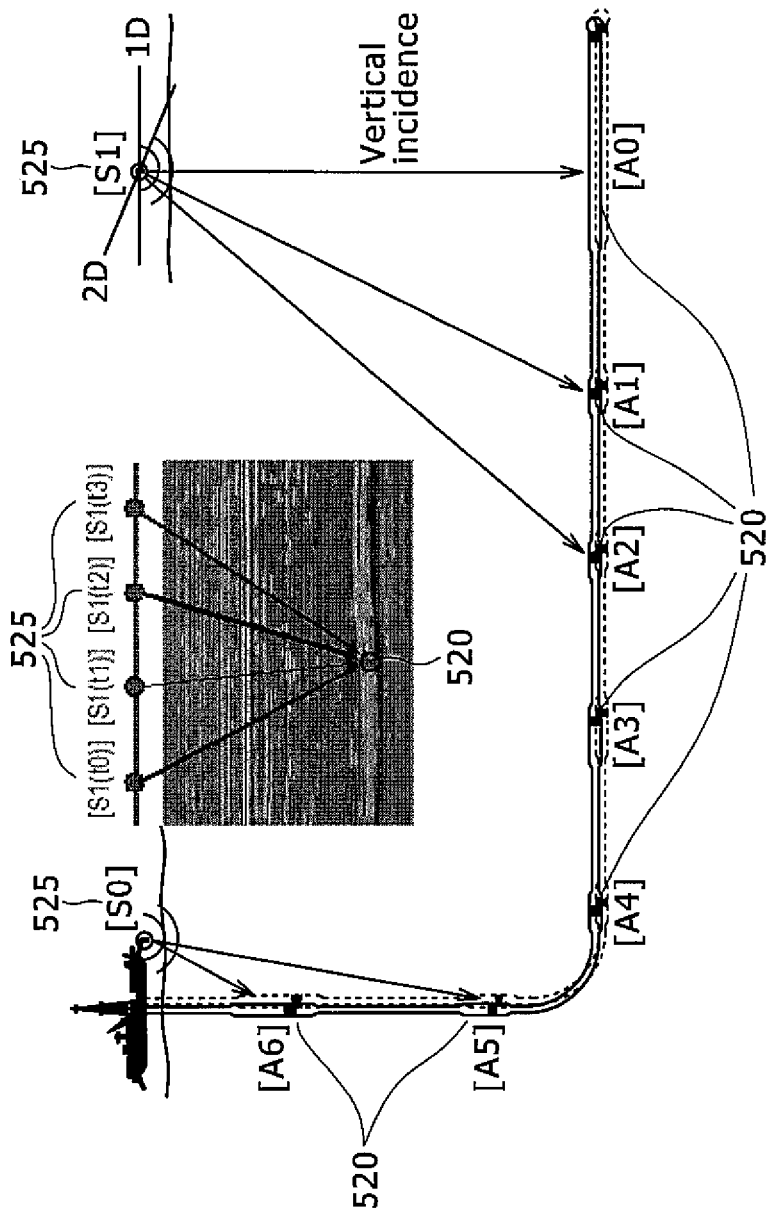

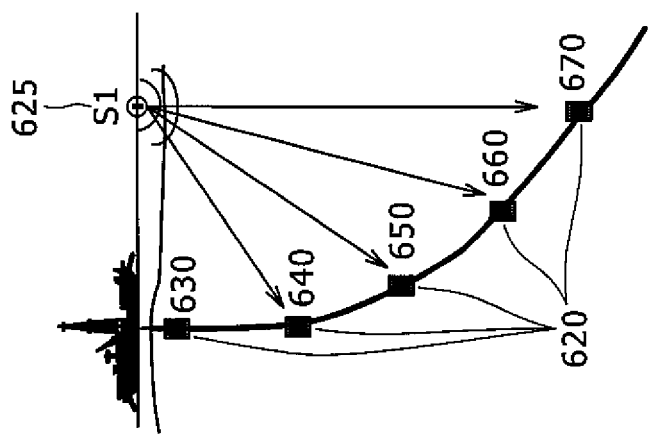
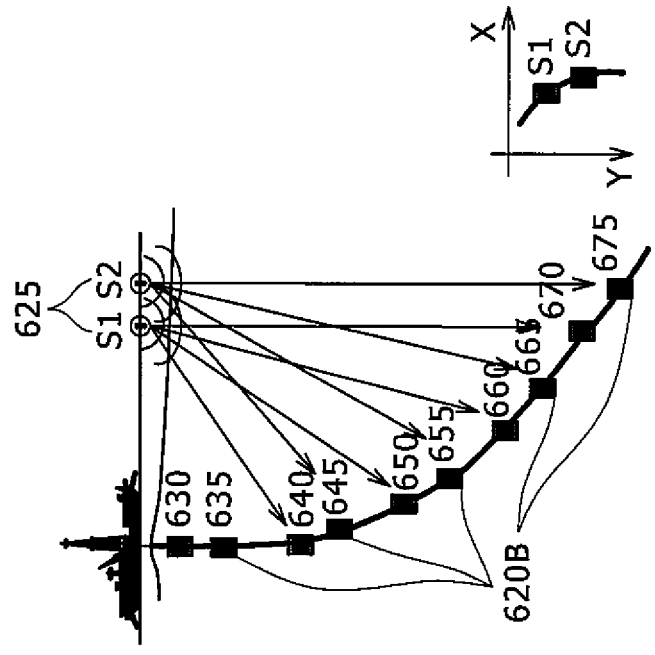

FIG.7A  FIG.7B  FIG.7C
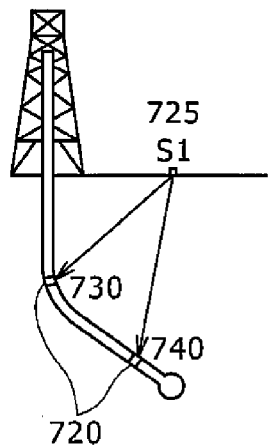
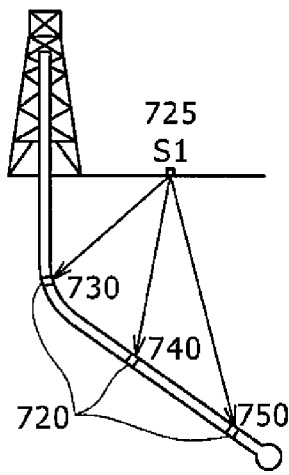
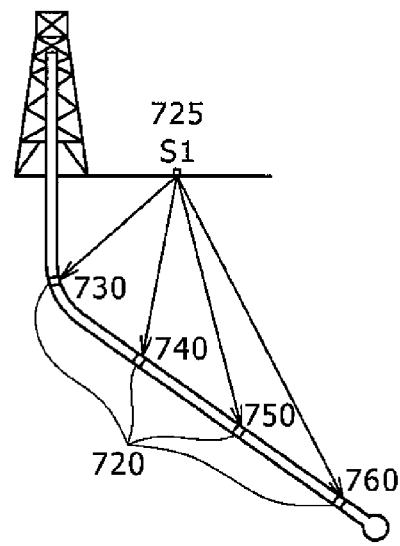
FIG.7D  FIG.7E
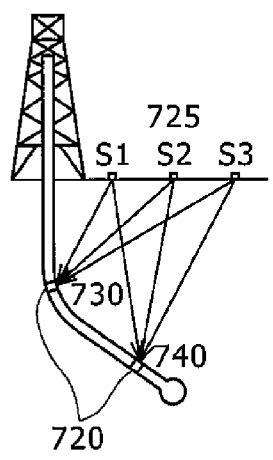
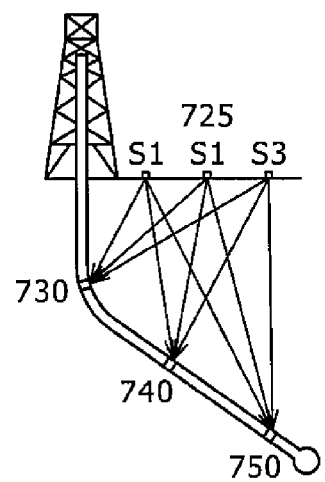

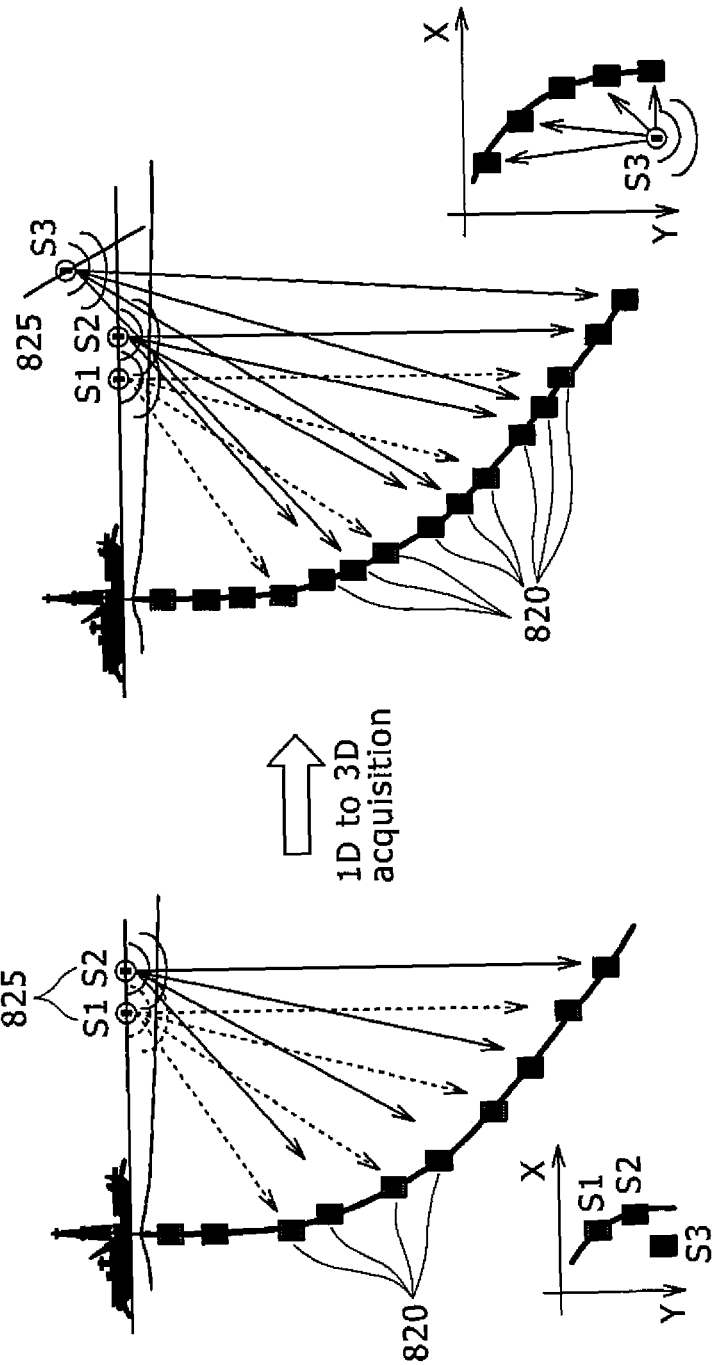

METHOD AND APPARATUS FOR SEISMIC DATA ACQUISITION DURING DRILLING OPERATIONS

RELATED APPLICATIONS

This application claims the benefit of U.S. Provisional Application No. 61/306,895, filed Feb. 22, 2010, and U.S. Provisional Application No. 61/433,497, filed Jan. 17, 2011, the contents of both of which are herein incorporated by reference.

BACKGROUND

1. Field of the Invention

The present disclosure relates generally to seismic operations and, more particularly, obtain seismic data during while drilling operations.

2. Description of the Related Art

The following descriptions and examples are not admitted to be prior art by virtue of their inclusion in this section.

The use of seismic data can provide valuable information regarding an underground formation and geological structure. Data may be obtained via a variety of methods, including, but not limited to wireline methods, drilling methods, and permanently placed sensors. However, in cases in which valuable rig time is used to obtain the data, some of these methods may be quite expensive.

Additionally, some methods have additional limitations. For example, drilling based methods typically use mud pulse telemetry and are therefore limited in the speed and amount of data that may be transmitted to the surface. Further, the data may only be transmitted during times in which the mud pumps are operating, limiting functionality. More convenient and less expensive drilling methods are needed.

SUMMARY

Embodiments of the claimed invention may comprise a method for obtaining formation data in which the method includes providing a plurality of sensors along a drill string. The method may further include repeating cycles of various functions. The cycles may include performing an operation moving the drill string relative to the borehole and stopping movement of the drill string relative to the borehole. Additional functions may include changing an overall length of the drill string and performing a measurement of a formation property while the drill string is relatively stationary.

Embodiments of the claimed invention may comprise an apparatus for obtaining formation data including a plurality of sensors and a drill string. At least two of the plurality of sensors are spaced apart along the drill string at substantially the same distance as a length of a segment of the drill string. The segment of the drill string is either added to or removed from the rest of the drill string as the drill string moves relative to a borehole during a drilling operation.

Embodiments of the claimed invention may comprise a method for obtaining formation data during drilling operations comprising the steps of providing a plurality of sensors along a drill string that includes a downhole tool and repeating a cycle of functions. The cycle of functions includes synchronizing the plurality of sensors with a GPS time signal, disconnecting the drill string while changing an overall length of the drill string, and actuating a series of one or more seismic disturbances while acquiring seismic data via the plurality of sensors. The method may further include buffering the seismic data, reconnecting the drill string, and communicating the seismic data to a processing device.

Other or alternative features will become apparent from the following description, from the drawings, and from the claims.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIGS. 5 and 5A are schematic illustrations of a WDP system with seismic distributed sensors using a rig and/or remote sources, according to an embodiment of the invention;

FIGS. 6A and 6B are schematic illustrations of a WDP system with seismic sensors embarked on repeaters and showing one-dimensional acquisition at different pipe connection locations corresponding to a first position 6A and a second position 6B, according to an embodiment of the invention;

FIGS. 7A-7E are schematic illustrations of a WDP system with single and multiple position seismic sources wherein drill pipe length is taken into account for seismic sensor spacing to provide 1D (FIGS. 7A-7C) and 3D (FIGS. 7D-7E) data records, according to an embodiment of the invention;

FIGS. 8A and 8B are schematic illustrations of a WDP system with seismic sensors embarked on repeaters and showing a one-dimensional to three-dimensional acquisition at different pipe connection locations with different source positions, according to an embodiment of the invention;

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements".

As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention. The term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool, among others.

Figure 1:
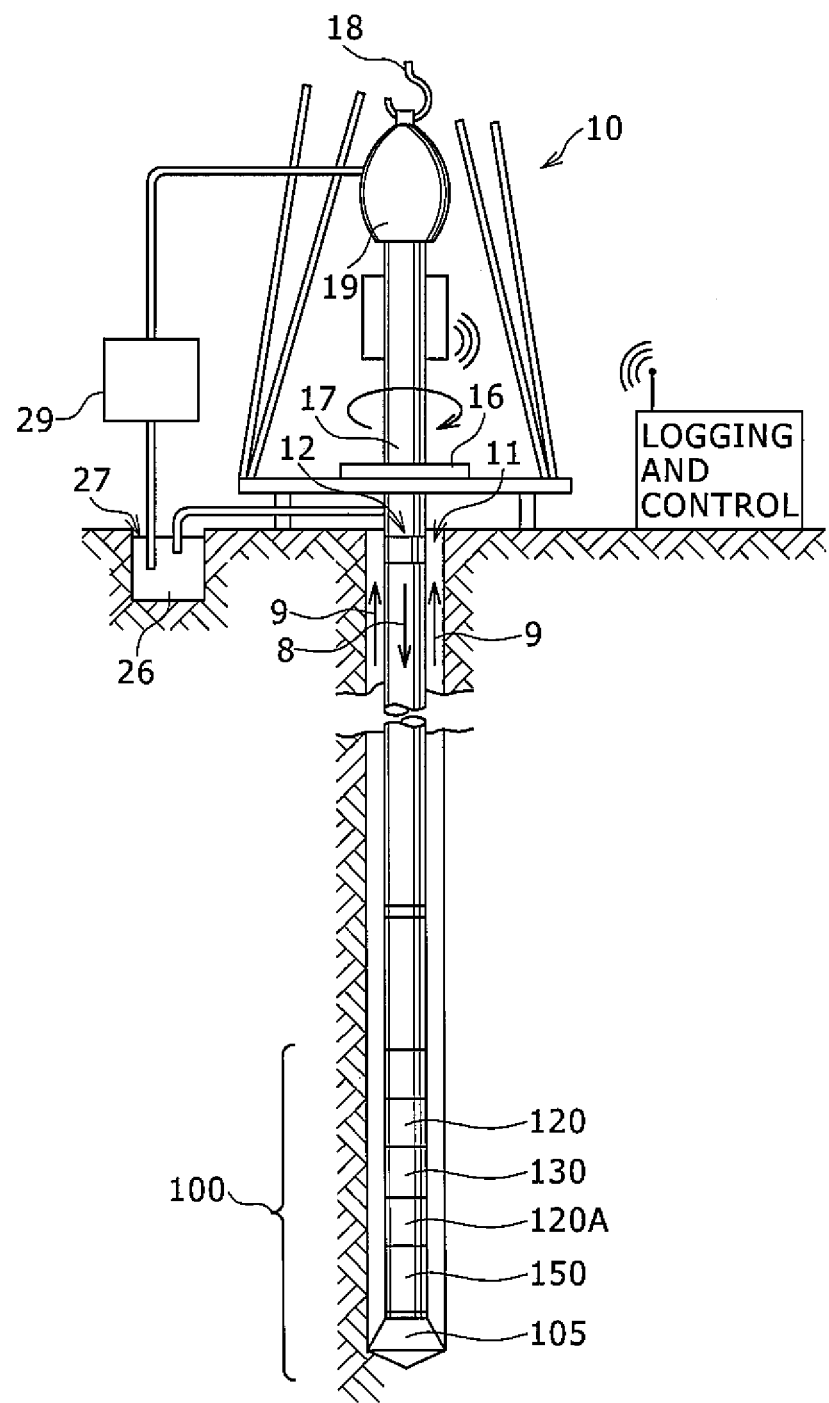
FIG. 1 is a schematic illustration of a wellsite system in which embodiments of the invention may be employed.

Referring generally to FIG. 1, this figure illustrates a wellsite system in which embodiments of the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19, which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly (BHA) 100 of the illustrated embodiment may include a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. such as represented at 120A. (References, throughout, to a module at the position of 120 can alternatively mean a module at the position of 120A or other positions along the drill string 12 as well.) The LWD module may include capabilities for measuring, processing, and storing information, as well as for communicating with the surface equipment. In the present embodiment, the LWD module includes a seismic measuring device.

The MWD module 130 is also housed in a special type of drill collar, as is known in the art, and can contain one or more devices for measuring the characteristics of the drill string 12 and drill bit 105. The MWD tool further includes an apparatus (not shown) for generating electrical power to the downhole system. This may typically include a mud turbine generator powered by the flow of the drilling fluid, it being understood that other power and/or battery systems may be employed either in addition or alternatively to the mud turbine generator. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device, among others.

Reliably conveying data and/or power along a drill string has become an increasingly important aspect of wellbore drilling operations. In particular, oil companies have become increasingly reliant on the use of real-time downhole information, particularly information related to the conditions associated with the drill bit 105, the BHA 100, and the formation or geology surrounding the wellbore, to improve the efficiency and accuracy of their drilling operations.

Numerous types of telemetry systems are commonly used in connection with MWD and LWD systems. For example, mud-pulse telemetry systems use modulated acoustic waves in the drilling fluid to convey data or information between the BHA 100 and the surface systems. However, mud-pulse telemetry systems have a relatively low data transmission rate of about 0.5-12 bits/second and, thus, substantially limit the amount of information that can be conveyed in real-time. As a result, the transmission rate limits the ability of an oil company to optimize their drilling operations in real-time. Other telemetry systems such as electromagnetic telemetry (EM) via subsurface earth pathways and acoustic telemetry through drill pipe have been employed. These other telemetry systems also provide a relatively low data rate that may limit the ability of an oil company to employ sophisticated real-time data processing to optimize its drilling operations.

Figure 2:
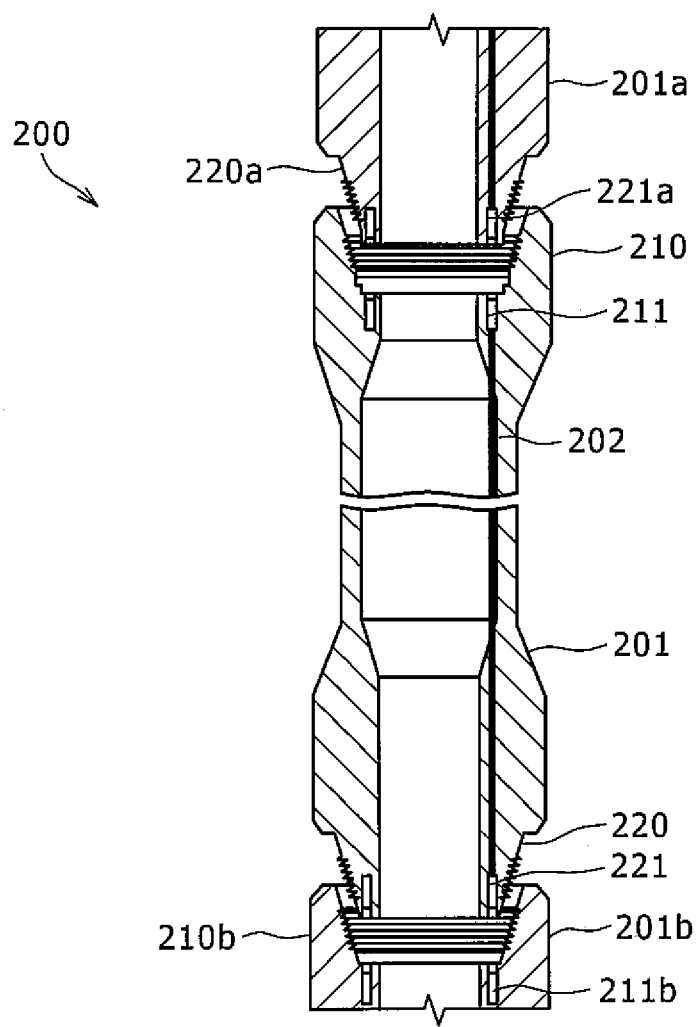
FIG. 2 is a side view of a cross-section of a wired drill pipe (WDP), according to an embodiment of the invention.

In contrast to mud-pulse and electromagnetic telemetry systems, a wired drill pipe (WDP) system can convey data at a relatively high rate along the length of a drill string. One example of a wired drill pipe system 200 is shown in FIG. 2, which shows three interconnected pipe sections 201, 201*a*, 201*b*. The upper pipe section 201*a* is connected to the center pipe section 201 by mating the pin end 220*a* of the upper section 201*a* with the box end 210 of the center pipe section 201. Likewise, the center pipe section 201 is connected with the lower pipe section 201*b* by mating the pin section 220 of the center pipe section 201 with the box end 210b of the lower pipe section 201b. In this manner, an entire drill string may be created by mating adjacent sections of pipe.

The center section 201 includes a communicative coupler 211 in the box end 210. When the upper pipe section 201a and the center pipe section 201 are connected, the communicative coupler 211 in the center pipe section is located proximate a communicative coupler 221a in the pin end 220a of the upper pipe section 201a. Likewise, a communicative coupler 221 in the pin end 220 of the center pipe section 201 may be proximate a communicative coupler 211b in the box end 210b of the lower pipe section 201b.

A wire 202 in the center pipe section 201 spans the length of the pipe section 201 and is connected to each communication coupler 211, 221. Thus, data and/or power that is transferred between adjacent pipe sections may be transferred through the wire to the communicative coupler at the opposing end of the pipe section, where it may then be transferred to the next adjacent pipe section.

The communicative couplers 211, 221 may be any type of coupler that enables the transfer of data and/or power between pipe sections. Such couplers include direct or galvanic contacts, inductive couplers, current couplers, and optical couplers, among others.

One example of a WDP is disclosed in U.S. Pat. No. 3,696,332, issued to Dickson, Jr., et al., which discloses a drill pipe with insulated contact rings positioned in a shoulder at both ends of the pipe. The contact rings in a single segment of pipe are connected by a conductor wire that spans the length of the pipe. When a segment of drill pipe is made up with an adjoining segment of pipe, the contact ring in the first segment of the wired pipe makes contact with a corresponding contact in the adjacent wired pipe section.

A U.S. Pat. No. 6,670,880 B2, issued to Hall, et al., discloses a system for transmitting data through multiple connected downhole components. Each component includes two communicative couplers and a conductor that connects the two. The communication elements comprise a wire loop disposed in a material that is magnetically conductive and electrically insulative (MCEI). Electrical current in the wire loop is converted into a magnetic flux in the MCEI material. The magnetic field is then communicated to the MCEI material in the communicative coupler in an adjacent pipe section, where the magnetic field induces a current in a wire loop in the adjacent communicative coupler.

Figure 3A:
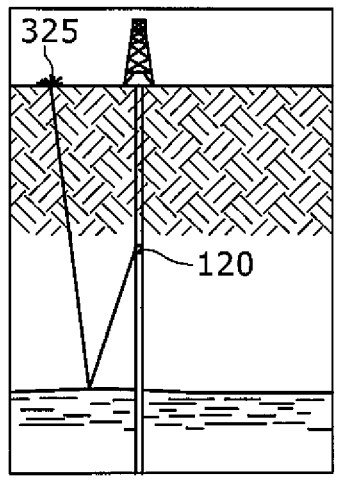
FIGS. 3A-3D are schematic illustrations of various seismic systems, according to embodiments of the invention.
Figure 3B:
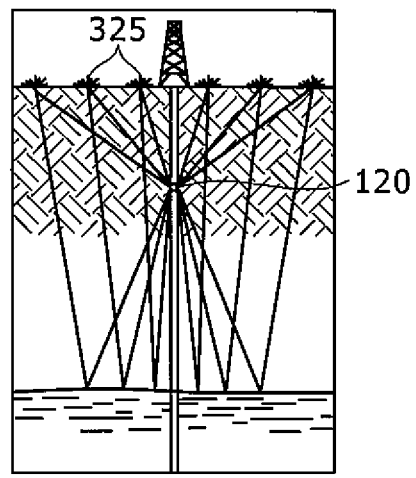
Figure 3C:
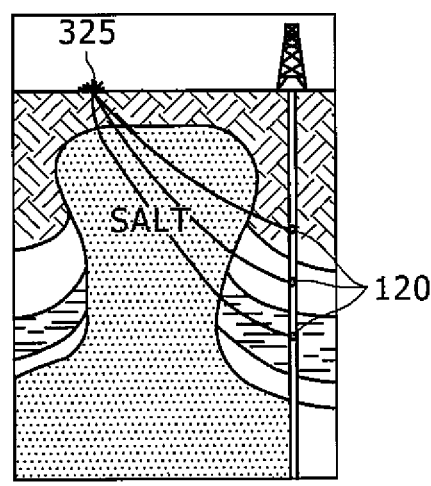
Figure 3D:
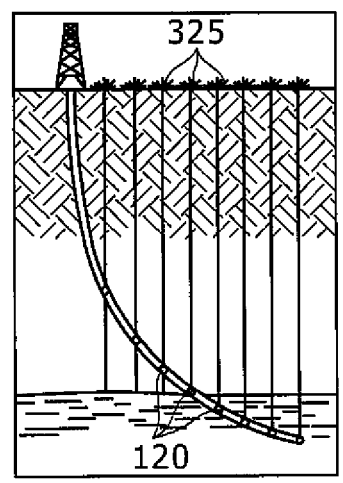

Turning generally to FIGS. 3A-3D, these figures illustrate a seismic-while-drilling tool which can be the LWD tool 120, or can be a part of an LWD tool suite 120A of the type disclosed in P. Breton et al., "Well Positioned Seismic Measurements," Oilfield Review, pp. 32-45, Spring, 2002, incorporated herein by reference. The downhole LWD tool can have a single receiver 120 (as depicted in FIGS. 3A and 3B), or plural receivers 120 (as depicted in FIGS. 3C and 3D), and can be employed in conjunction with a single seismic source 325 at the surface (as depicted in FIGS. 3A and 3C) or plural seismic sources 325 at the surface (as depicted in FIGS. 3B and 3D).

As shown, FIG. 3A, which includes a reflection off of a bed boundary, and is called a "zero-offset" vertical seismic profile (VSP) arrangement, uses a single source 325 and a single receiver 120. FIG. 3B, which includes multiple reflections off of a bed boundary, and is called a "walkaway" vertical seismic profile arrangement, uses plural sources 325 and a single receiver 120. FIG. 3C, which includes refractions through salt dome boundaries, and is called a "salt proximity" vertical seismic profile, uses a single source 325 and plural receivers 120. And FIG. 3D, which includes some reflections off of a bed boundary, and is called a "walk above" vertical seismic profile, uses plural sources 325 and plural receivers 120.

With regard to plural receivers 120, plural receivers 120 can be represented by a number of individual receiving sensors provided in a single tool or drill string, or can also be represented by a single receiving sensor provided in a single tool or drill string in which the single receiver is moved to multiple receiver positions. The movement of the drill string allows for a single receiver to function as a plurality of receivers. Of course the movement of the drill string also allows for two or more receivers to functionally act as an even greater number of receivers due to the receivers changing positions as the drill string moves; i.e. multiple receiver positions or locations in the wellbore are equivalent to multiple receivers provided in the drill string.

In addition to the WDP disclosed above, the pipe or drill string may include one or more sensors or sensor packages. In one embodiment, the sensors may include geophones and hydrophones, among others. A sensor package for example may include one or more of the above sensors and, in one particular embodiment, may include three single axis geophones and a hydrophone. The sensors or packages (hereinafter "sensors") may be located inside of the pipe sections as an integral part of the WDP and/or may be part of a sub assembly that is disposed between the sections of pipe. Regardless of location, the sensors may further include any necessary hardware and electronics to operate the sensors, including wiring, battery, processors and memory, as necessary.

Figure 4:
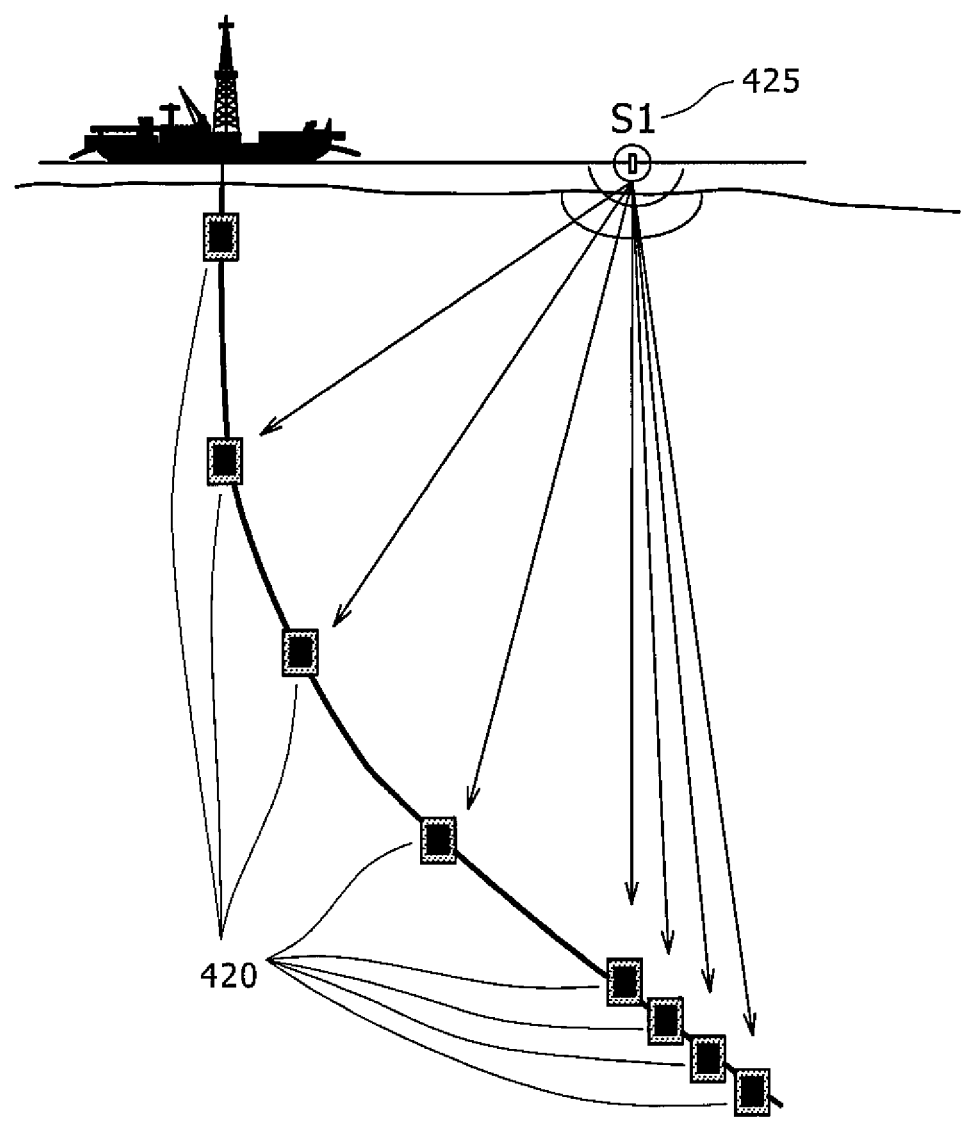
FIG. 4 is a schematic illustration of a WDP system with seismic sensors located at flexible spatial sampling and using a surface source, according to an embodiment of the invention.

Now with reference to FIG. 4, in order to properly operate and send downhole data to the surface without losses, WDP systems may use repeaters placed at predefined distances. The WDP repeaters are used to increase the gain of the telemeter downhole signal to surface. By implementing seismic sensors 420 in or along with the WDP repeaters and/or interfacing with the WDP network, spatially distributed seismic sensors 420 can be used to record seismic data generated through the actuation of a seismic source 425. Variably spaced seismic sensors 420 are shown in this figure for example, with a higher concentration of sensors 420 proximate to or near the drill bit or end of the drill string.

Embodiments of the system may operate by synchronizing all of the repeaters together with the surface (and/or downhole) source or by running independent downhole seismic clocks with GPS accuracy and controlled drift. However, the ability to synchronize all of the repeaters together may allow for the downhole use of lower accuracy seismic clocks as the drift is reset to zero prior to the activation or recording of the seismic signals. Accordingly, the synchronizable downhole clocks do not need to maintain their drift to as precise a degree as the independent downhole seismic clocks (which may be configured to operate independently for a longer time period than the synchronizable downhole clocks). For example, the potential drift period of the synchronizable downhole clocks may need to take into account the amount of time needed to connect another wired drill pipe to the drill string, whereas the potential drift period of the independent downhole clocks may need to take into account the amount of time needed to complete a seismic survey.

In both cases of the synchronizable and independent downhole seismic clocks, potential drift periods may arise at least in part because the downhole clocks are separated from a GPS reference signal. The separation and resulting drift period may last for either the time in which the WDP is disconnected during the drilling operation (e.g., such as with the synchronizable downhole seismic clocks), or for the amount of time the tool is downhole (e.g., such as with the independent downhole seismic clocks). Disconnection of the WDP during a connection time (e.g., in which a section of drill pipe is either added (during run in) or removed (during pulling out)) in some cases disconnects the link to the network and separates the clocks from the GPS reference signal. However, in situations in which the system is configured so as to have the downhole clocks continuously connected to the network or a communications interface, GPS accuracy could be established and maintained by continuously sending a GPS reference signal or synchronizing signal downhole. In some cases, the system is configured to record while the WDP (and network connection) is connected and disconnected.

Referring generally to FIGS. 5 and 5A, seismic single or multi-component information can be sent through WDP telemetry for each of the distributed seismic sensors 520 (e.g., in single level or array level) to be processed and analyzed on the surface. The processing and analyzing may take place with existing or dedicated seismic processing techniques (checkshots, vertical seismic profile (VSP), tomography, interferometry, etc.).

During pipe connection/disconnection and/or on user demand and/or while pumps are turn off, the surface seismic source 525 (e.g., single and/or multiple, stationary and/or moving) can be activated and all seismic distributed sensors 520 may acquire the seismic data information (e.g., sensor waveforms and/or processed traveling time with associated quality control (QC)). In some cases, such as shown in an illustrative embodiment depicted in FIG. 5A, multiple seismic sources 525 may interact with a single seismic sensor 520 in a manner similar to a tomography technique. Additionally, in other embodiments, the seismic data may be recovered when the WDP telemetry is restored.

In some cases, embodiments of the network of distributed seismic sensors may be flexibly configured, such as via combining sparse to short spacing between sensors with fixed to variable distances between each other. Referring to FIGS. 6A and 6B, use of different lengths of drill pipe may allow for variable positioning of sensors 620 downhole (e.g., in multiple receiver positions as opposed to using overlapping or duplicative receiver positions). FIG. 6A shows the relative positions 630-670 of evenly spaced (in this example) sensors 620 as a seismic source 625 is activated. FIG. 6B shows the relative positions 635-675 of the same sensors 620 during a seismic source 625 activation when a different length of drill pipe or the stopping of a drilling operation is used to offset the sensors 620 from their previous positions 630-670 to those positions 635-675 represented by 620B.

In other illustrative cases, the positioning of the various seismic sensors may take into account the typical length of a drill pipe or drill pipe section (e.g., such as a section comprising multiple drill pipes) and allow for multiple measurements to be made at approximately the same downhole locations by multiple sensors (see FIGS. 7A-7E). The measurements may be configured to provide for one dimensional (1D) well and/or data acquisitions. As shown in FIG. 7A, seismic source 725 is activated when sensors 720 are approximately located at positions 730 and 740. The sensors 720 in this illustrative embodiment are spaced approximately one drill pipe length apart. After the next length of drill pipe is added to the drill string, sensors 720 are again located at positions 730 and 740. In addition to these positions, the most distal sensor 720 proximate to the drill bit is now located at position 750 (see FIG. 7B). FIG. 7C shows the situation when one additional length of drill pipe added and sensors 720 located at positions 730 to 760. Embodiments configured as such may be able to take advantage of multiple data sets at approximately the same locations downhole, thereby increasing accuracy and potentially reducing the effects of noise or other interference.

FIGS. 7D and 7E shows a similar embodiment in which the sensors 720 are also spaced approximately one drill pipe length apart. However, in this illustrative embodiment, multiple seismic source 725 locations are used to provide for a three dimensional (3D) well and/or data acquisition. In some cases, the multiple seismic sources 725 may all three be actuated during a connection time in which another length of drill pipe is added to or removed from the drill string. In other cases, one or more seismic sources 725 may be actuated during each connection time and the cumulative results used to create a 3D well image. In some embodiments, the addition of time stamping the data sets to record the time between connection breaks and the use of generally similar seismic sensor locations may provide for a four dimensional (4D) representation of the well during the drilling process.

In other embodiments, such as in order to more precisely survey and acquire simple and/or complex structures, and as shown in FIGS. 8A and 8B, the positions of the distributed seismic sensors 820 may be optimized so as to acquire the maximum set of source positions to distributed sensor locations (or in other cases source position to distributed sensors location). Indeed, as seen in the figure, between two acquisitions, the sources 825 (single or multiples) can be positioned at different offsets to record up to three dimensional (3D) information if desirable. The use of multiple positions, sensors, and sources, may provide increased resolution and accuracy to vertical seismic profiles allowing for increased efficiency and effectiveness in drilling and production.

Such geometry of acquisition combining an optimized distributed seismic sensor network and WDP telemetry system would provide valuable information for complex seismic structures definition. Using the WDP system, not only vertical incidence data are recorded but also deviated ray paths that can be used to invert anisotropy parameters in real-time for further seismic migration. The same methodology can also help to acquire salt proximity surveys and steer the well in real-time by better imaging the underground structure.

Figure 9:
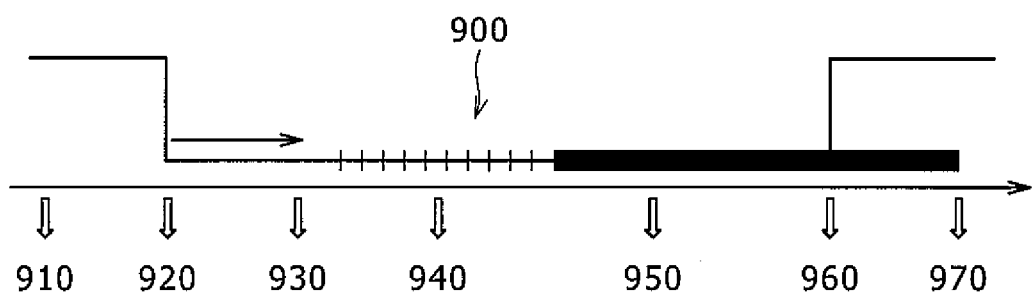
FIG. 9 is a schematic illustration showing a general timeline for a seismic distributed sensor acquisition process according to an embodiment of the invention.

Turning now to FIG. 9, a schematic of a representative acquisition methodology is shown in which seismic acquisition is accomplished during connection time either while running in or pulling out. Of course, this is only one of a number of different acquisition methodologies that may be used with embodiments of the present invention. This exemplary method will be explained in further detail below.

As shown in the figure, general timeline 900 represents a single cycle between connection times or level of data acquisition. At the first stage 910, the downhole tool is turned ON and synchronized with surface GPS. The drill string may drill down to the next level and paused while the next section of pipe is prepared for attaching to the drill string. While at this point, stage 920, the network is down, i.e., the drill string is disconnected and stationary.

There now exists an opportunity to activate a seismic source and record seismic waveforms while the noise from the drilling operation and various components (e.g., such as mud pumps, etc.) are shut down. In stage 930, in order to ensure separation from the noise and effects of the drilling operation, there may be a latency to start downhole acquisition, in some cases this may be approximately 30 seconds.

The activation of seismic sources is now ready to begin, stage 940. In some cases or situations, there may be an acquisition every 15 seconds for a total of 10 shots (illustrative time and quantity). Of course different intervals and quantities of seismic source shots may be used depending upon the downhole conditions. After activation of the seismic sources in stage 940, the data may be buffered prior to sending back to the surface. The data buffering occurs in stage 950. Note that the drill string may be moving during this interval.

In stage 960, the drill string may be connected. During this time the network may be back on line. The downhole drift can be checked versus the surface GPS and the downhole data may be sent to the surface. The data is recovered on the surface and the tool switched to 'power save mode' for stage 970, then the drill string continues drilling down to the next level and the cycle repeats.

Measurements should be made while the pumps are off and the pipe is stationary in order to decrease the noise level and provide the best data quality. In order to decrease the rig usage time and lower the costs of the measurements, the measurements should be transparent to the drilling operation and performed during connection times. In practice, the connection time for connecting and disconnecting various sections of pipe may can vary from 2 min to 15 min (and even up to 30 min) depending on rig system, rig crew, pipe handling, and rig activity (e.g., tripping in, drilling, reaming, pulling out of hole, among others). In some cases however, conditions required for measurement can be fulfilled by simply stopping the pumps and maintaining the position of the drill string while activating the seismic sources.

In most of the cases, the measurements will be done while pipe is disconnected during a connection process, stage 910, which saves rig time as well and provides a time window long enough to acquire a minimum number of shots (such as 5 shots for example). When the acquisition is done during the pipe connection process, some embodiments of the downhole system should be synchronized just prior to disconnecting the pipe or otherwise disconnecting the network communicating with the downhole seismic sensors.

The frequency of synchronization is typically determined by considering the accuracy and drift of the downhole clocks. The downhole clocks should be selected such that accurate timing is maintained during the pipe connection period (in some cases, equivalent to the potential drift period), which can go up to 30 minutes or longer. During this period, the downhole system will be recording seismic waveforms (e.g., such as three or six second waveforms as an illustrative example). Other embodiments may be recording other lengths of waveforms such as really short waveforms to continuous monitoring and other potential forms of sampling.

A sampling rate for each of the shots should be determined with consideration for the application and environment of the downhole system (for example, a sampling rate may be 2 ms, although longer and shorter sampling rates may be used). The sampling rate may be synchronized to the synchronized air gun (or some other form of seismic source) fired (or otherwise actuated) on or near the surface. In some cases, a latency period such as stage 930 may exist prior to the actuation of the downhole acquisition and/or firing of shots. For example, shots may be performed on a 15 seconds cycle launched by the user and can be stopped anytime for health and safety reasons or because the pipe is moving (e.g., such as end of connection).

Each shot waveform should be recorded and then recovered on surface through WDP telemetry either using a wireless connection (e.g., such as WiFi, inductive coupling, acoustic transmission, short hop, or other) or by waiting for the network to be restored after the pipe connection is made. In some cases, such as while tripping in or pulling out, the top drive is usually not connected as a driller may primarily only use the elevator. In these situations, no data will be recovered during this period unless embodiments of the system include wireless telemetry to enable such practice.

The acquisition logic can be autonomously triggered by the system when the network is down while the pipe is disconnected. This event would correspond to the pipe connection process. Upon identification that the network is down, the downhole sensors can be automated in order to launch the downhole acquisition system, in some cases following the lapse of a latency period. Of course, in other embodiments or in addition to the automated system, a user should still be able to require or initiate the acquisition 'on demand'.

After or during acquisition, the data should be buffered prior to sending to the surface, stage 950, in order for efficient transmission of data. Buffering may not be needed depending upon the transmission bandwidth of the technology used, for example, with fiber optic transmission. But even in when using high bandwidth transmission protocols, buffering may still be employed in order to optimize the transmission process. In some situations, the pipe may be moving during the buffering of the data.

When the network is re-established, such as through the connection of a pipe, the surface system may check the downhole clocks for drift relative to the surface GPS timing, such as in stage 960. The downhole data may then be sent to the surface, either individually addressing each sensor or addressing two or more sensors in parallel. The transmission protocol may be determined in part by the telemetry system provided in the embodiment of the system.

After transmission of data, in stage 970 the tool may be switched to a power save mode while continuing to drill or transition into or out of the borehole. The power save mode would help to extend the life of any batteries, capacitors, or other forms of energy storage used downhole. The individual sensors may be switched to power save mode as their buffers are emptied of seismic data or at the completion of two or more sensors having emptied their buffers, such as when a tool or section has emptied the buffers of their respective sensors.

Additionally, sensor can be switched off one by one, sequentially if parallel transmission requires too much bandwidth, similar to the way internet packets are sent one by one. In some cases, the sensors and the entire tool will be switched to a power save mode, thereby reducing the amount of energy consumed by the various electronic devices. This may occur after the end of transmission of the final (or in some embodiments single) sensor's seismic data buffer. Each sensor level may buffer all of the shots of the seismic source acquired during the connection time for each component.

Some embodiments of the present system may include hydrophone sensors. However, in other cases orthogonal geophones can also be included. The introduction of orthogonal geophone accelerometer sensors (GAC) (e.g., such as moving coil dynamic accelerometer) can provide a much better frequency response than the current geophones. The orthogonal GAC sensors may also contribute to an improve data quality and capability of various embodiments of downhole systems.

Each of the sensing components should be recorded and potentially buffered downhole before being recovered on the surface. For example, usually, depending upon the application and geological environment, not more than 10 shots per level will be acquired during an acquisition. Using a 15 second interval between shots for example, this would represent 150 seconds worth of acquisition period, i.e. a 2 min 30 seconds acquisition.

In some embodiments, in order to more accurately value the geophone measurements, the orientation of the geophones is measured using orthogonal accelerometers. Of course, the orientation may also or alternatively be determined by any of a number of types of orientation measurement devices, such as a magnetometer, among others. Once the orientation is determined, the full processing of salt proximity surveys is enabled (as an example).

In some cases, the orientation does not have to be extremely accurate (e.g., <5 degrees for example) in order to process the salt proximity survey. However, the geophone data will be more valuable when the tool is in contact with the formation. In order for this to occur, the borehole will require at least an approximate 10 deg inclination. This would be one passive method of establishing contact.

In some embodiments a deployment system may be included for establishing tool contact with the formation. For example, an illustrative embodiment may use WDP to provide power downhole, allowing the deployment of a system (such as a mechanical, electrical, hydraulic, pneumatic or combination of methods, among others) that will extend, clamp, or otherwise place the geophone against the borehole for an improved acoustic coupling and thus better data quality.

The orthogonal accelerometers (or others) can also be used to record 3-axial shock information. The accelerometer information should be sent to the surface so that the data may be used by the processing team in order to evaluate the data quality.

Timing of the downhole clocks is directly related to the functionality of the array. In some embodiments, the timing between each level of sensor should be controlled below a 50 microsec accuracy and the full set of sensors should be synchronized with the surface GPS to within a 10 microsec accuracy. The timing of the drift of the individual clocks should be maintained below 10 microsecs over the acquisition time period without having to be resynchronized with the surface (e.g., such as when the pipe is disconnected). In some cases, the acquisition time period (potential drift period) may be as long as 15 minutes (e.g., for example, the time period may be longer or shorter than 15 minutes). However, to establish a factor of safety, it would be desirable to have a longer time period (e.g., such as 30 minutes for a factor of safety of 2) in which the drift was maintained below 10 microsecs.

As stated previously, the downhole timing should then be checked relative to the surface timing once the network is back on-line. Both timings should be compared and information made available to the field engineer running the acquisition. In some cases, the timing may be used to automatically or manually adjust the processing of the data.

In embodiments of the current invention, downhole processing may be focused on, but not limited to, acquisition of the data. Complex processing is not required to be performed downhole, but may be performed downhole depending upon the capacity and capability of the electronics. In other cases, the downhole data may be sent to the surface where complex processing can be more readily handled.

Data should be recorded and digitized downhole following the acquisition logic and then potentially buffered before being sent to the surface. The memory capacity should be determined to allow for one or more sets of acquisition data sets in case an inadequate amount of time exists to completely download the data prior to initiating the next set of acquisition shots. In some embodiments, the data will not be recorded permanently downhole but will have to be buffered before being recovered on surface. The last level of information should be able to be stored as long as necessary prior to being received on surface.

The measurement of seismic data is a passive measurement. Consequently, embodiments of the downhole system can be optimized to minimize the power consumption and better manage the battery life or other power source. As the measurement is made during the pipe connection period, for example, stored energy such as from a battery is necessary to power the individual sensor levels in order to allow acquisition and to maintain the timing (i.e., since in some cases when the pipe is disconnected, the network and energy transmission downhole is down). Once the data had been recovered on surface, the sensor level can be switched to a power save mode.

The power save mode should also be available in a variety of situations. The power save mode may be implemented 'on demand', or automatic in cases in which the connection time period exceeds some set level, such as 15 or 30 minutes for example, or in between stationary acquisitions once the data had been recovered. Also, a power save functionality (power save mode) can be used when the system is waiting on the deck and otherwise not in use.

For a single level of seismic data acquisition, power will be required for a number of operations. For example, power will be required to acquire the data, buffering and storing the data in memory while waiting for communication to be established with the surface, emptying the buffer, and switching the tool to a power save mode. The power consumption for a downhole system should be determined for both tool on and tool in save mode, in order to provide an estimation of the battery life and predict the maximum or furthest seismic level able to be recorded. This estimation should be available in real-time to allow for decisions to be made regarding the tool.

In some embodiments, a single seismic data level should be able to record a predetermined number of data sets, for example, a total of 1,000 data sets could be recorded if a system was configured for 10 shots every 15 seconds per level, per run. Depending on the application, embodiments of some downhole systems should remain operational for a predetermined maximum amount of time, for example, in some situations this may be a total of 15 days without pulling out of hole while in other situations, 500 hours may be more appropriate. In some embodiments, the energy storage systems or batteries are removable at the wellsite in order to facilitate replacement. In other cases, rechargeable batteries are used.

Each sensor level may be contained in a 30 ft Instrumented Drill Collar (IDC) single. Drill Collars are usually placed above the BHA and offer a relatively constant OD/ID over each 30 ft single. Note that in horizontal wells, the number of Drill Collars is limited. Packaging each level in a 30 ft Drill Collar limits the issues of packaging in elements like repeaters, which may appear as a longer shoulder.

Having each sensor level in a 30 ft Drill Collar also multiplies the overall level of flexibility available for building the array. For example, some of the various configurations can be:
=IDC-IDC-DC=DC-DC-DC=: 30 ft inter-level spacing
=IDC-DC-IDC=DC-DC-DC=: 60 ft inter-level spacing
=IDC-DC-DC=IDC-DC-DC=: 90 ft inter-level spacing This example shows the flexibility of an embodiment of an acquisition system with only 2 sensor levels. Aspects of the teachings described herein may be applied to other configurations, lengths, combinations, and locations as appropriate, depending upon the application, method, and required results of the system.

However, Drill Collars are just one example of a potential location for a sensor level. Depending upon the situation and application, sensor levels may be provided throughout the drilling assembly, from the drill bit to the surface. The sensor levels may be random, uniform, or some combination of random and uniform spacing. In some cases multiple sensors may be used at a single level in multiple orientations.

The use of an embodiment of the seismic tool along with the results of a surveying tool can yield important data. Surveying tools typically include accelerometer and/or magnetometer and/or gyro systems and may be used either inside or outside of the casing to provide direction and inclination information for particular depths. This data may be combined with the depth at which the seismic acquisition is made and recorded to memory. Then, for example, three component geophone information can be sent to the surface through WDP telemetry with the addition of the survey information. The orthogonal geophone information can be processed on surface using knowledge of their orientation versus the seismic source, which can then be used for locating salt flanks or other complex structures.

Several techniques can be used to determine the orientation of the geophones versus a surveying package. For example, the tool face orientation may be measured from seismic tool to surveying tool after being torque together. The orientation of the geophones should be known versus this reference mark. This is similar to orienting a surveying package versus a reference mark. Similar techniques are also used to estimate the mud motor bend direction versus a MWD tool. Additionally, the seismic tool can be designed to incorporate the surveying package in the same assembly by fixing the design of the orientation of both set of sensors.

Figure 10:
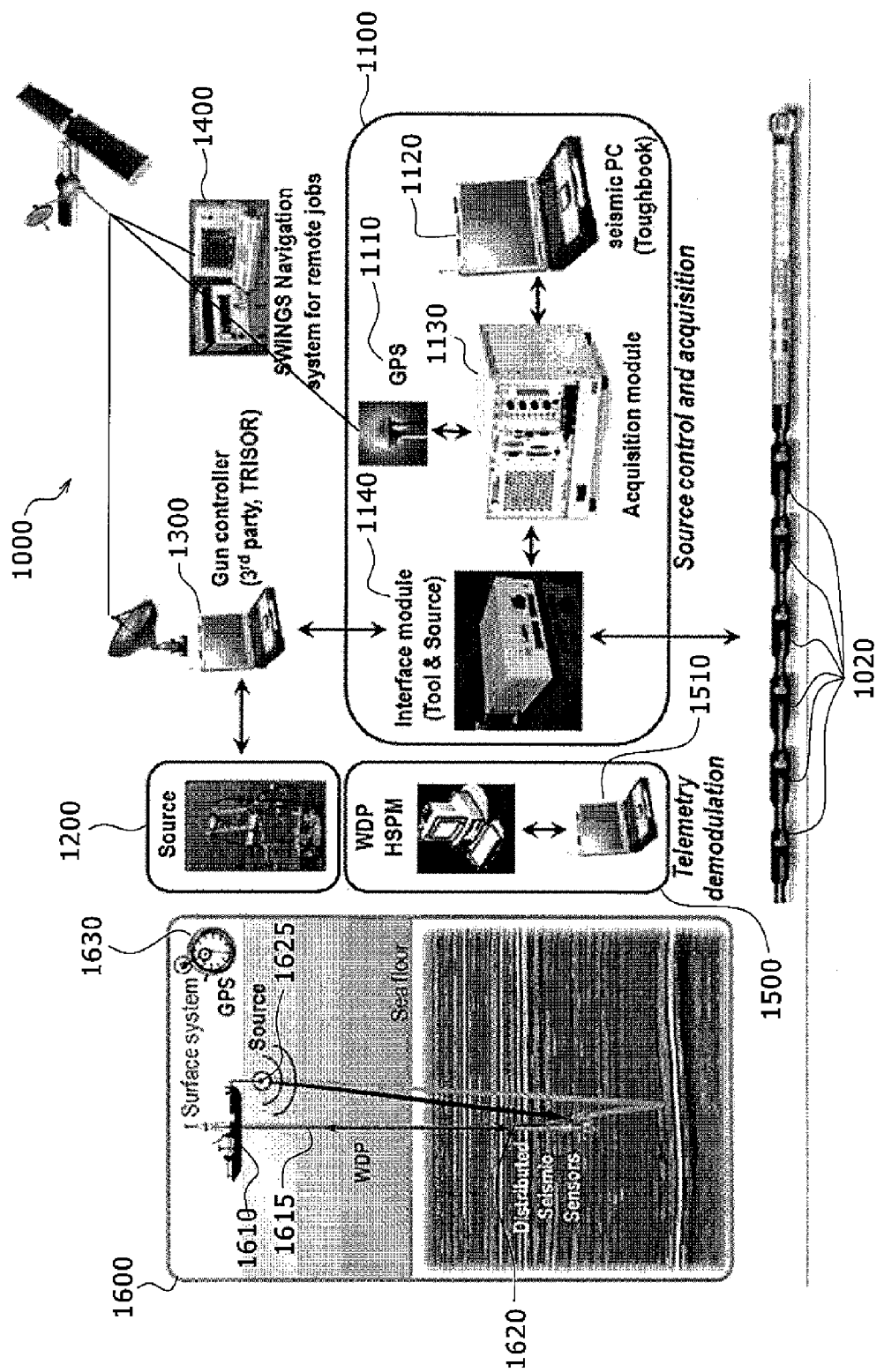
FIG. 10 is a schematic illustration showing a general form of a surface acquisition system, according to an embodiment of the invention.

Referring generally to FIG. 10, in order to fully facilitate a downhole seismic acquisition system, some embodiments may include a surface system 1000. The surface system 1000 may be configured in multiple ways depending on application and needs of the specific environment. As a non-limiting example, block 1600 shows a partial schematic of a drill ship 1610 drilling in a seabed using wired drill pipe 1615 comprising distributed seismic sensors 1620. A seismic source 1625 from the drill ship 1610 is actuated to produce seismic signals that are received by the distributed seismic sensors 1620. The distributed seismic sensors 1620 and the surface system may be synchronized through the use of the global positioning system (GPS) 1630 time signals at the surface.

In more detail, an illustrative embodiment of a surface system 1000 may comprise some or all of the various components depending upon the requirements of the particular application. A surface system 1000 may include a source control and acquisition module 1100. The source control and acquisition module 1100 may comprise a GPS 1110 interface, a processor 1120 such as a portable personal computer (PC), an acquisition modules 1130 for acquiring the seismic data from downhole, and an interface module 1140 for communicating with the distributed seismic sensors 1020 and other various components, such as a source controller 1300.

In some embodiments, the source control and acquisition module 1100 may generally function to initiate the actuation of the seismic source 1200 via a source controller 1300 such as a gun controller and an interface module 1140. The actuation of the seismic source 1200 may be dependent upon the position of the source in some cases. In these situations, a navigation system 1400 may be included to determine the position of the seismic source 1200 as well as controlling the firing strategy, such as the command, timing and well plan surveys. The navigation system 1400 may be in communication with the source control and acquisition module 110 and the source controller 1400 via satellite or other form of communication interface.

The data from the distributed seismic sensors 1020 may be coupled to the source control and acquisition module 1100 via a telemetry demodulation interface 1500. The telemetry demodulation interface 1500 may include a processor 1510 such as a microprocessor to handle downhole data control, such as buffering, indexing, and recording, among other functions, and communications with the surface such as the source control and acquisition module 1100 via WDP or HSPM.

In some embodiments, the surface system 1000 may be configured to perform some or all of the following non-limiting list of functions:
Synchronization with GPS at the surface
Actuating seismic sources such as surface air guns at GPS accuracy
Recording the source signature and parameters
Handling and processing the downhole acquisition logic
Synchronizing the downhole system with surface GPS timing
Launching downhole acquisition
Setting downhole parameters whenever required
Checking the timing once the WDP network is re-established
Gathering the data
Applying any necessary corrections
Matching a source signature and individual waveforms
Providing Quality Control (QC) indicator of waveform quality at the wellsite to facilitate decision making. This may allow for each level to be validated before the next one is acquired.
Transmitting data to remote operation for expert processing Once the data are available on the surface, waveform data should be formatted to allow for any or all of the non-limiting list of the following:
Stacking individual levels together and being able to QC the best ones to be used for the stacking process
Filtering the waveforms
Processing the time break
Processing Vertical Seismic Profiles (VSP) (zero and vertical incidence)
Processing multi-offset VSP
Processing Salt Proximity Survey As part of the prejob, acquisition geometry, inter-level spacing and source placement should be modeled, defined and optimized.

By combining all events where seismic information can be acquired (e.g., such as drill pipe connections occurring while tripping in, drilling, and pulling out passes as well as short trips and other events during the lifetime of a section, on demand request and/or pump off trigger), a significant number of seismic acquisitions can be recorded with single or multiple sources placed at different offsets varying or not during the bit run.

In some embodiments, the firing of the seismic source elements may be controlled via the downhole tools. The downhole acquisition tools may be configured to trigger the surface seismic source. In still other embodiments, the seismic source may be located downhole and controlled either by the downhole acquisition tools and/or a surface controller. The downhole seismic source may be in addition to or in place of one or more surface sources.

In even further embodiments, the configuration of an embodiment of a downhole system may include a downhole seismic source with receivers located downhole, a downhole seismic source with receivers provided on the surface, a downhole seismic source with receivers provided both downhole and on the surface, a downhole seismic source with receivers downhole and a surface seismic source, a downhole seismic source with a surface seismic source and downhole receivers and surface receivers. Of course, embodiments including other configurations of systems not expressly identified in which aspects of this disclosure may be applied are also considered within the scope of the current invention.

It will be understood from the foregoing description that various modifications and changes may be made in the preferred and alternative embodiments of the present invention without departing from its true spirit. In addition, this description is intended for purposes of illustration only and should not be construed in a limiting sense.

What is claimed is:

1. A method for obtaining formation data, comprising:
providing a plurality of sensors along a drill string;
repeating a cycle comprising:
performing an operation moving the drill string relative to the borehole;
stopping movement of the drill string relative to the borehole;
changing an overall length of the drill string; and
performing a measurement of a formation property while the drill string is relatively stationary,
in which at least two of the plurality of sensors are spaced apart such that a measurement of one of the at least two sensors is taken at a second cycle at the same location where a measurement of another of the at least two sensors is taken at a previous cycle.

2. A method for obtaining formation data, comprising:
providing a plurality of sensors along a drill string;
repeating a cycle comprising:
performing an operation moving the drill string relative to the borehole;
stopping movement of the drill string relative to the borehole;
changing an overall length of the drill string; and
performing a measurement of a formation property while the drill string is relatively stationary,
in which at least one of the plurality of sensors is provided in an instrumented drill collar.

3. A method for obtaining formation data, comprising:
providing a plurality of sensors along a drill string;
repeating a cycle comprising:
performing an operation moving the drill string relative to the borehole;
stopping movement of the drill string relative to the borehole;
changing an overall length of the drill string; and
performing a measurement of a formation property while the drill string is relatively stationary,
wherein the plurality of sensors includes seismic sensors, said method further comprising activating two or more seismic sources provided at different locations.

4. A method for obtaining formation data, comprising:
providing a plurality of sensors along a drill string;
repeating a cycle comprising:
performing an operation moving the drill string relative to the borehole;
stopping movement of the drill string relative to the borehole;
changing an overall length of the drill string; and
performing a measurement of a formation property while the drill string is relatively stationary,
wherein the plurality of sensors has a first spacing between two or more individual sensors proximate to a distal end of the drill string and a second spacing between remaining sensors of the plurality of sensors, wherein the first spacing is less than the second spacing.

5. The method according to claim 4 in which the plurality of sensors is evenly spaced.

6. The method according to claim 4 in which changing the overall length of the drill string is by a relatively uniform amount for each cycle.

7. The method according to claim 4 in which the drill string comprises wired drill pipe (WDP) and at least one of the plurality of sensors is provided in a WDP repeater.

8. The method according to claim 4 in which the operation is a drilling operation.

9. The method according to claim 4 wherein the plurality of sensors includes seismic sensors.

10. The method according to claim 9 further comprising activating a seismic source as part of the performing a measurement.

11. An apparatus for obtaining formation data comprising:
a plurality of sensors;
a drill string;
wherein at least two of the plurality of sensors are spaced apart substantially at same distance as a length of a segment of drill sting added to or removed from the drill string as the drill string moves relative to a borehole during a drilling operation,
wherein the plurality of sensors has a first spacing between two or more individual sensors proximate to a distal end of the drill string and a second spacing between remaining sensors of the plurality of sensors, wherein the first spacing is less than the second spacing.

12. The apparatus according to claim 11 wherein the plurality of sensors are seismic sensors.

13. The apparatus according to claim 11 wherein at least one of the plurality of sensors is provided in an instrumented drill collar.

14. The apparatus according to claim 11 wherein the drill string comprises wired drill pipe (WDP) and at least one of the plurality of sensors is provided in a WDP repeater.

15. A method for obtaining formation data during drilling operations comprising:
providing a plurality of sensors along a drill string including a downhole tool;
repeating a cycle comprising:
synchronizing the plurality of sensors with a global positioning system (GPS) time signal;
disconnecting the drill string while changing an overall length of the drill string;
actuating a series of one or more seismic disturbances while acquiring seismic data via the plurality of sensors;
buffering the seismic data;
reconnecting the drill string;
communicating the seismic data to a processing device.

16. The method according to claim 15 wherein a network communicating with the plurality of sensors is disconnected during the disconnecting of the drill string and reconnected during the reconnecting of the drill string.

17. The method according to claim 15 wherein the plurality of sensors is switched to a lower power usage during drilling operations.

18. The method according to claim 15 wherein at least two of the plurality of sensors are spaced along the drill string so that changing the overall length of the drill string results in at least one redundant measurement from the previous cycle.

* * * * *